US010853042B2

(12) United States Patent
Lopez Ruiz et al.

(10) Patent No.: US 10,853,042 B2
(45) Date of Patent: *Dec. 1, 2020

(54) INTERACTIVE CODE OPTIMIZER

(71) Applicant: Microsoft Technology Licensing, LLC, Redmond, WA (US)

(72) Inventors: Marcelo Lopez Ruiz, Kirkland, WA (US); Ivan Nevraev, Redmond, WA (US); David M. Peixotto, Seattle, WA (US); Xiang Li, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/443,392

(22) Filed: Jun. 17, 2019

(65) Prior Publication Data
US 2020/0004515 A1 Jan. 2, 2020

Related U.S. Application Data

(63) Continuation of application No. 15/882,529, filed on Jan. 29, 2018, now Pat. No. 10,365,904.

(60) Provisional application No. 62/565,861, filed on Sep. 29, 2017.

(51) Int. Cl.
*G06F 8/41* (2018.01)
*G06F 8/33* (2018.01)

(52) U.S. Cl.
CPC ............ *G06F 8/443* (2013.01); *G06F 8/447* (2013.01); *G06F 8/33* (2013.01)

(58) Field of Classification Search
USPC .......................................................... 717/159
See application file for complete search history.

(56) References Cited

U.S. PATENT DOCUMENTS

| | | | |
|---|---|---|---|
| 5,442,790 A * | 8/1995 | Nosenchuck | G06F 8/443 717/146 |
| 7,000,227 B1 * | 2/2006 | Henry | G06F 8/443 717/146 |
| 7,340,733 B2 * | 3/2008 | Archambault | G06F 8/4441 717/106 |

(Continued)

OTHER PUBLICATIONS

Jensen et al.; "Compiler Feedback using Continuous Dynamic Compilation during Development"; Workshop on Dynamic Compilation Everywhere; Jan. 2014 (Year: 2014).*

(Continued)

*Primary Examiner* — Wei Y Zhen
*Assistant Examiner* — Clint Thatcher
(74) *Attorney, Agent, or Firm* — Ray Quinney & Nebeker; Tiffany Healy

(57) ABSTRACT

Methods and devices for generating program code representations may include receiving program code or edited program code for an application executing on the computer device. The methods and devices may include receiving an identification of a selected pipeline from a plurality of pipelines that defines a plurality of passes of actions to execute on the program code or the edited program code to optimize the program code or the edited program code. The methods and devices may include running the selected pipeline and generate optimizer output with a program code representation of the program code.

20 Claims, 7 Drawing Sheets

(56) References Cited

U.S. PATENT DOCUMENTS

| 7,496,908 B2* | 2/2009 | Dewitt, Jr. | G06F 8/443 |
| | | | 717/154 |
| 2009/0064117 A1* | 3/2009 | Bashkansky | G06F 8/443 |
| | | | 717/154 |
| 2012/0017196 A1* | 1/2012 | Ng | G06F 30/327 |
| | | | 717/104 |

OTHER PUBLICATIONS

Fursin et al.; "Building a Practical Iterative Interactive Compiler"; International Workshop on Statistical and Machine Learning Approaches Applied to Architectures and Compilation (SMART'07); Jan. 2007 (Year: 2007).*

"Tracing Just-In-Time Compilation"; Wikipedia.org website; Dec. 14, 2016 (Year: 2016).*

* cited by examiner

INTERACTIVE CODE OPTIMIZER

RELATED APPLICATION

This application is a continuation of U.S. patent application Ser. No. 15/882,529 entitled "Interactive Code Optimizer," filed Jan. 29, 2018, and claims priority to U.S. Application No. 62/565,861 titled "Interactive Code Optimizer," filed Sep. 29, 2017. The entirety of each of the foregoing applications is hereby incorporated by reference herein.

BACKGROUND

The present disclosure relates to devices and methods of compiling program code.

Compilers typically optimize code through a series of passes. Developers seeking to optimize their programs may have a difficult time understanding why a compiler optimizer might produce a particular code sequence. Interactively working with a compiler optimizer by inspecting the outputs of each transformation allows visibility into the code sequence, but this may be of limited use, as there is no way to learn through 'what-if' experimentation of the code. Moreover, optimizers may write out the code they work on at various points, but typically these are limited representations of the code.

Thus, there is a need in the art for improvements in devices and methods of compiling program code.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

One example implementation relates to a computer device. The computer device may include a memory to store data and instructions, a processor in communication with the memory, a compiler in communication with the memory and processor. The compiler may be operable to receive program code or edited program code for an application executing on a computer device; receive an identification of a selected pipeline from a plurality of pipelines that defines a plurality of passes of actions to execute on the program code or the edited program code to optimize the program code or the edited program code; and run the selected pipeline and generate optimizer output with a program code representation of the program code, wherein the program code representation is provided after execution of each pass of the plurality of passes.

Another example implementation relates to a method for generating program code representations. The method may include receiving, at a compiler on a computer device, program code or edited program code for an application executing on the computer device. The method may include receiving an identification of a selected pipeline from a plurality of pipelines that defines a plurality of passes of actions to execute on the program code or the edited program code to optimize the program code or the edited program code. The method may include running the selected pipeline and generate optimizer output with a program code representation of the program code, wherein the program code representation is provided after execution of each pass of the plurality of passes.

Another example implementation relates to computer-readable medium storing instructions executable by a computer device. The computer-readable medium may include at least one instruction for causing the computer device to receive program code or edited program code for an application executing on a computer device. The computer-readable medium may include at least one instruction for causing the computer device to receive an identification of a selected pipeline from a plurality of pipelines that defines a plurality of passes of actions to execute on the program code or the edited program code to optimize the program code or the edited program code. The computer-readable medium may include at least one instruction for causing the computer device to run the selected pipeline and generate optimizer output with a program code representation of the program code, wherein the program code representation is provided after execution of each pass of the plurality of passes.

Additional advantages and novel features relating to implementations of the present disclosure will be set forth in part in the description that follows, and in part will become more apparent to those skilled in the art upon examination of the following or upon learning by practice thereof.

DETAILED DESCRIPTION

This disclosure relates to devices and methods for interactive editing of intermediate optimizer representations of program code during an optimization process. The devices and methods may use a compiler to improve program code through a series of passes within an optimization pipeline. For example, a developer of program code may want to improve the program code so that the program code may perform faster and/or use less memory. An optimization pipeline may describe the work the optimizer performs on the program code to achieve a desired outcome for improving and/or changing the program code.

The devices and methods may allow a user using a compiler to interactively edit the program code at any point between the passes executed by the optimizer and resume optimization of the program code. Moreover, the devices and methods may provide an automatic configuration of an optimizer to resume optimization from a given point. As such, a user may be able to interactively edit program code and restart the optimization process at different points in an optimization pipeline and populate the edits throughout the remaining passes in the optimization pipeline to improve the program code or the efficiency of the process.

For example, a user, such as a compiler developer and/or a software developer, may use the disclosed devices and methods to verify whether changes to program code may be worthwhile and/or produce an expected outcome when developing a compiler and/or a program. Moreover, a user may use the devices and methods to verify whether program code is correct and/or debug program code. By using the optimizer, a user may speed up the development process by verifying outcomes before making the changes in the program code. As such, the devices and methods may allow software and/or compiler developers the flexibility to experiment with program code at multiple points during the optimization process by interactively editing program code at any point between the passes executed by the optimizer and resume optimization of program code.

Figure 1:
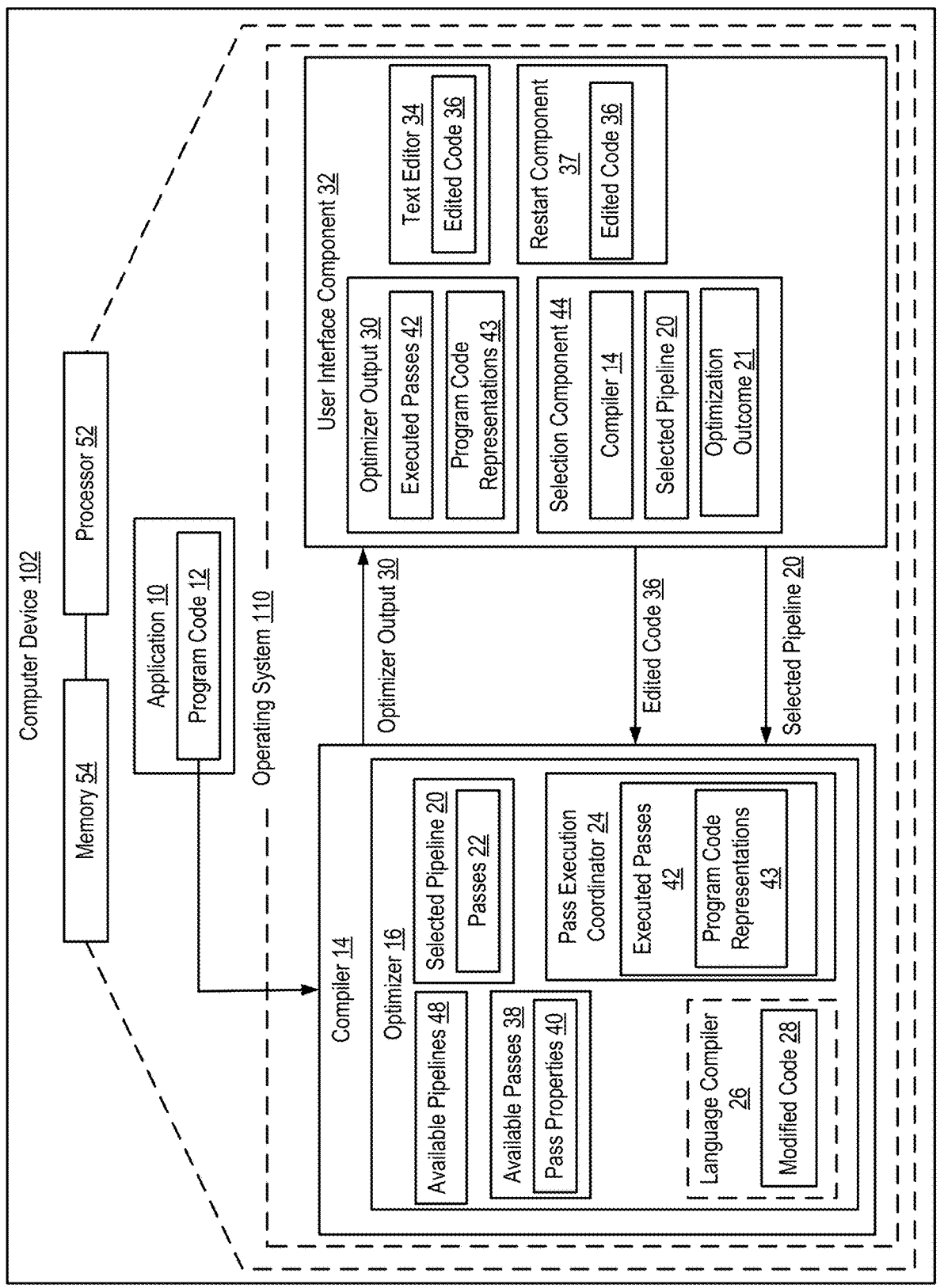
FIG. 1 is a schematic block diagram of an example computer device in accordance with an implementation of the present disclosure.

Referring now to FIG. 1, illustrated therein is an example computer device 102 for use with interactive editing of intermediate optimizer representations of program code. Computer device 102 may include a plurality of applications 10 (e.g., up to n applications, where n is a positive number) executed or processed by processor 52 and/or system memory 54 of computer device 102. A user of computer device 102 may have developed program code 12 for one or more applications 10 executing on computer device 102 and may want to use compiler 14 to verify and/or improve program code 12.

Computer device 102 may include an operating system 110 executed by processor 52 and/or system memory 54 of computer device 102. System memory 54 may be configured for storing data and/or computer-executable instructions defining and/or associated with operating system 110, and processor 52 may execute operating system 110. An example of system memory 54 can include, but is not limited to, a type of memory usable by a computer, such as random access memory (RAM), read only memory (ROM), tapes, magnetic discs, optical discs, volatile memory, non-volatile memory, and any combination thereof. An example of processor 52 can include, but is not limited to, any processor specially programmed as described herein, including a controller, microcontroller, application specific integrated circuit (ASIC), field programmable gate array (FPGA), system on chip (SoC), or other programmable logic or state machine. Computer device 102 may include any mobile or fixed computer device, which may be connectable to a network. Computer device 102 may be, for example, a computer device such as a desktop or laptop or tablet computer, a cellular telephone, a gaming device, a mixed reality or virtual reality device, a music device, a television, a navigation system, a camera, a personal digital assistant (PDA), or a handheld device, or any other computer device having wired and/or wireless connection capability with one or more other devices.

Operating system 110 may include a user interface component 32 that may display outputs and accepts inputs and/or commands from the user. User interface component 32 may include a selection component 44 that allows a user to select to use compiler 14 and/or optimizer 16 to verify and/or improve program code 12. For example, a user may want to reduce a memory size of the program code 12, make the program code 12 easier to debug, and/or modify the program code 12 to increase the speed of execution of the program code 12. In addition, a user may select to use compiler 14 and/or optimizer 16 to verify whether a potential change may be worthwhile before editing program code 12 with the change.

A user of computer device 102 may use user interface component 32 to load the program code 12 into compiler 14. In another implementation, application 10 may automatically transmit program code 12 to compiler 14.

Complier 14 may include optimizer 16 operable to accept program code 12 and a selected optimization pipeline 20, execute the selected pipeline 20, and provide optimizer output 30 that includes the final program form as well as program code representations 43 of the program code 12 as it exists at each point in the selected pipeline 20. Pipeline 20 may describe the work the optimizer 16 performs on the program code 12 to achieve a desired outcome for improving and/or changing the program code 12. A pipeline may describe a series of passes to run and their configuration, for example, a pass to reorder instructions to favor fewer registers in exchange for more instructions up to a configured limit, followed by a pass to propagate constants, followed by a pass to remove dead code. An example implementation will be described below that provides detailed examples of the functions of compiler 14.

Optimizer 16 may optionally include a language compiler 26 operable to transform program code 12 into a modified code 28 form suitable for the optimizer 16. For example, if the program code 12 is in a format not recognizable by the optimizer 16, language compiler 26 may transform the original program code 12 into modified code 28 recognized by the compiler 14. For example, language compiler 26 may use a map to change commands from one language to another. Language compiler 26 may also perform the conversion of program code 12 into a modified code 28 form by using known compiler techniques, such as, parsing, abstract syntax tree manipulation and code generation. Language compiler 26 may also provide an optimization pipeline that provides a user an understanding of compiler options (e.g., flags to control precision, level of optimization, whether debug information is to be preserved, etc.). The optimization pipeline may be different from the pipeline 20 that the user selects.

In an implementation of compiler 14, user interface component 32 may present one or more available pipelines 48 for optimizer 16 that describe various operations that optimizer 16 may perform on program code 12 in the form of transformation and/or optimization passes 22. Example pipelines 48 may include, but are not limited to, pipelines to optimize program code for speed, pipelines to optimize program code to be smaller, and pipelines to make the program code easier to debug.

User interface component 32 may also present one or more available passes 38 and the corresponding pass properties 40. The one or more available passes 38 may include a list of actions optimizer 16 may perform to achieve the desired outcomes of pipelines 48. For example, the available passes 38 may be cumbersome to handle by hand, such as, but not limited to, register allocation, instruction selection, constant propagation, verification, and dead code elimination. Pass properties 40 may describe the actions optimizer 16 may perform when executing the one or more available passes 38. For example, pass properties 40 may include, but are not limited to, a limit to a number of iterations to perform when removing dead code, and an estimate for memory latency on the target computer.

A user may choose one of the available pipelines 48, e.g., the selected pipeline 20, for optimizer 16 to perform. In addition, a user may edit and/or revise the passes 22 associated with the selected pipeline 20. For example, a user may remove one or more passes 22 for the selected pipeline 20. In addition, a user may rearrange one or more passes 22 to modify an order in which the selected pipeline 20 executes the one or more passes 22. For example, a user may remove one or more passes 22 to speed up optimizer 16. A user may also rearrange an order in which the one or more passes 22 are executed in the selected pipeline 20. For example, a user may want to run a pass 22 to remove dead code from the program code 12 early in the selected pipeline 20 to clean up the program code 12 before additional passes 22 are executed on the program code 12.

Figure 2:
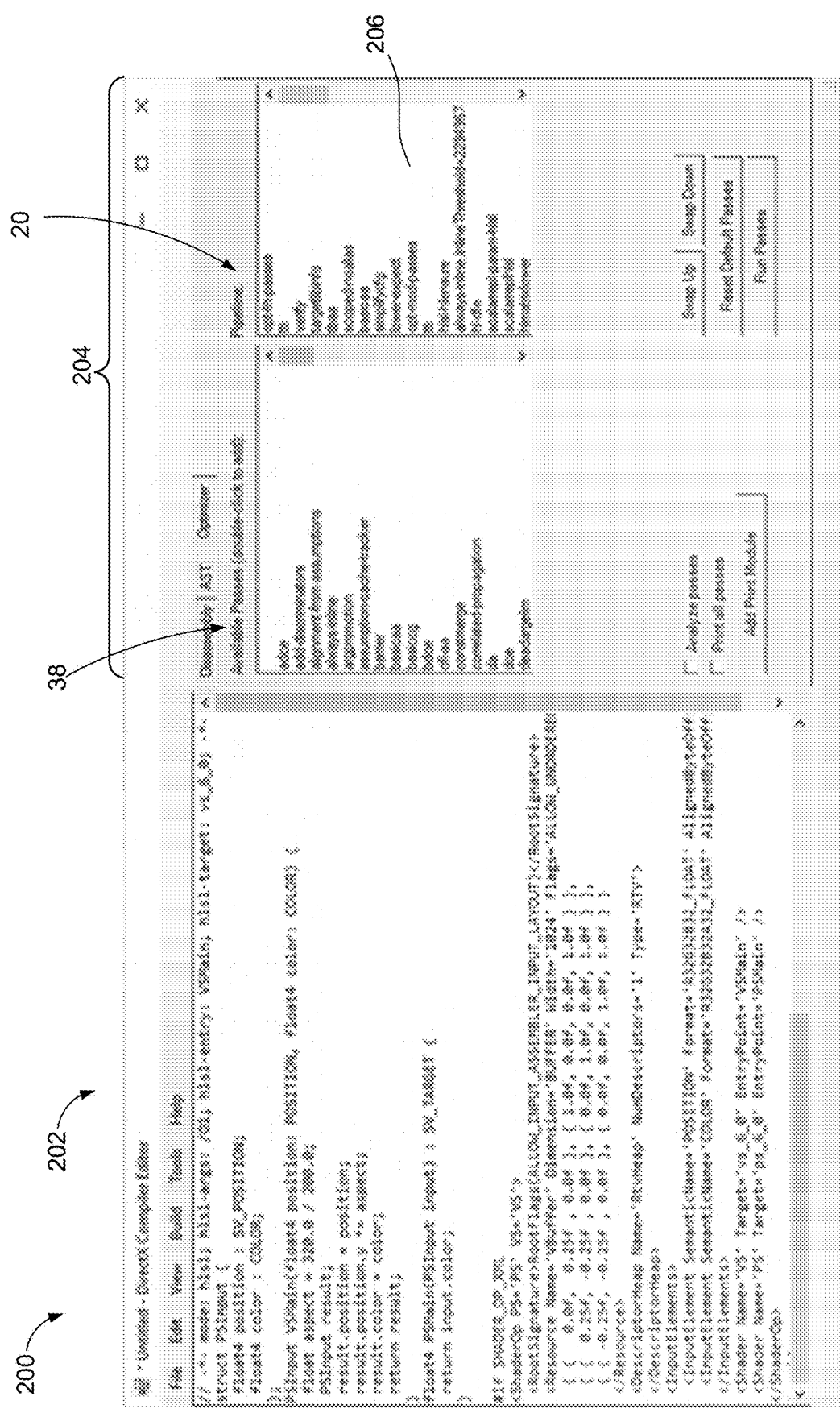
FIG. 2 is an example user interface screen that displays program code and available passes provided by an optimizer for a pipeline configuration in accordance with an implementation of the present disclosure.

Referring to FIG. 2, an example user interface screen 200 displays program code 12 (FIG. 1) created by a user and available passes 38 (FIG. 1) provided by an optimizer 16 (FIG. 1) for a configuration of a selected pipeline 20. User interface screen 200 may have a left section 202 that displays the program code 12 and a right section 204 that displays available passes 38 for an available pipeline 48. In the right section 204, user interface screen 200 presents two lists: one of available passes 38 (provided by optimizer 16) and one with the current pipeline configuration (provided by the compiler 14, taking into account the /O1 argument specified in the program text to request that the program be compiled quickly rather than in a more optimal manner). A description of work the optimizer 16 may perform for each pass 38 may be presented at 206.

User interface screen 200 may provide a high-level program representation of the selected pipeline 20 configuration. As such, a user may modify the selected pipeline 20 configuration by adding, removing, reordering, and/or changing the properties of passes 22 of the selected pipeline 20 from among the available passes 38. The user may select the 'Run Passes' option to obtain a disassembly of the program or the final program in binary form. When the user selects 'Print all passes', the optimizer runs with the given pipeline and provides a program representation at each pass in the pipeline.

Referring back to FIG. 1, in another implementation, optimizer 16 may automatically choose selected pipeline 20 from the one or more available pipelines 48 to run on program code 12. A user may select an optimization outcome 21 and based on the selected optimization outcome 21, optimizer 16 may automatically choose selected pipeline 20 and a selected list of passes 22 to achieve the selected optimization outcome 21. For example, a user may select an optimization outcome 21 for smaller code, e.g., code that uses less memory space. Optimizer 16 may automatically choose selected pipeline 20 and selected list of passes 22 to reduce the memory size occupied by program code 12 to achieve the smaller code. If a user selects an optimization outcome 21 for faster code, e.g., code that may be processed more efficiently, optimizer 16 may automatically choose a different selected pipeline 20 and a different selected list of passes 22 to make the program code 12 faster. As such, different optimization outcomes 21 may have the same and/or different selected pipelines 20 to achieve the desired changes to the program code.

Optimizer 16 may execute the passes 22 for the selected pipeline 20 on the received program code 12. Optimizer 16 may include a pass execution coordinator 24 that initializes, configures, and/or runs each pass 22 as described in the selected pipeline 20. Pass execution coordinator 24 may also coordinate the inputs and outputs of each pass 22, as well as any shared state. For example, during a pass 22, pass execution coordinator 24 may calculate data for future passes to make a decision based on the calculated data. One example may include a pass may compute an interference graph (e.g., a description of program values that are simultaneously in use at different points in the program), and later passes may use the information in the interference graph to make decisions while optimizing code. In an alternate implementation, a pass may indicate a need for a current interference graph to make decisions. As such, pass execution coordinator 24 may ensure that an interference graph was computed (e.g., by a prior pass or with another mechanism) and made available to the pass. Pass execution coordinator 24 may also generate and/or collect program code representations 43 for the program code 12 after each executed pass 42.

Optimizer 16 may generate optimizer output 30 once the passes 22 for the selected pipeline 20 are completed. The optimizer output 30 may include, for example, a list of executed passes 42 on the program code 12 and the program code representations 43 of the program code 12 at each executed pass 42. The program code representations 43 may be an assembly listing in text form or a binary encoding of assembly. In an implementation, the program code representations 43 may include a human readable representation of the program code 12 at each executed pass 42. In both cases, some amount of metadata is provided in addition to the program instructions. The optimizer output 30 may also include a final program in binary form upon completion of the executed passes 42.

User interface component 32 may present the optimizer output 30 to a user. For example, the user interface component 32 may include a display configured to present the program code representations 43 and executed passes 42 in a text-based format with one line per pass and configuration options following each pass name on that line so that a user may use a text editor 34 to copy and paste the configuration between programs, edit the program code representations 43, and/or save the program code representations 43 along with sources.

Figure 3:
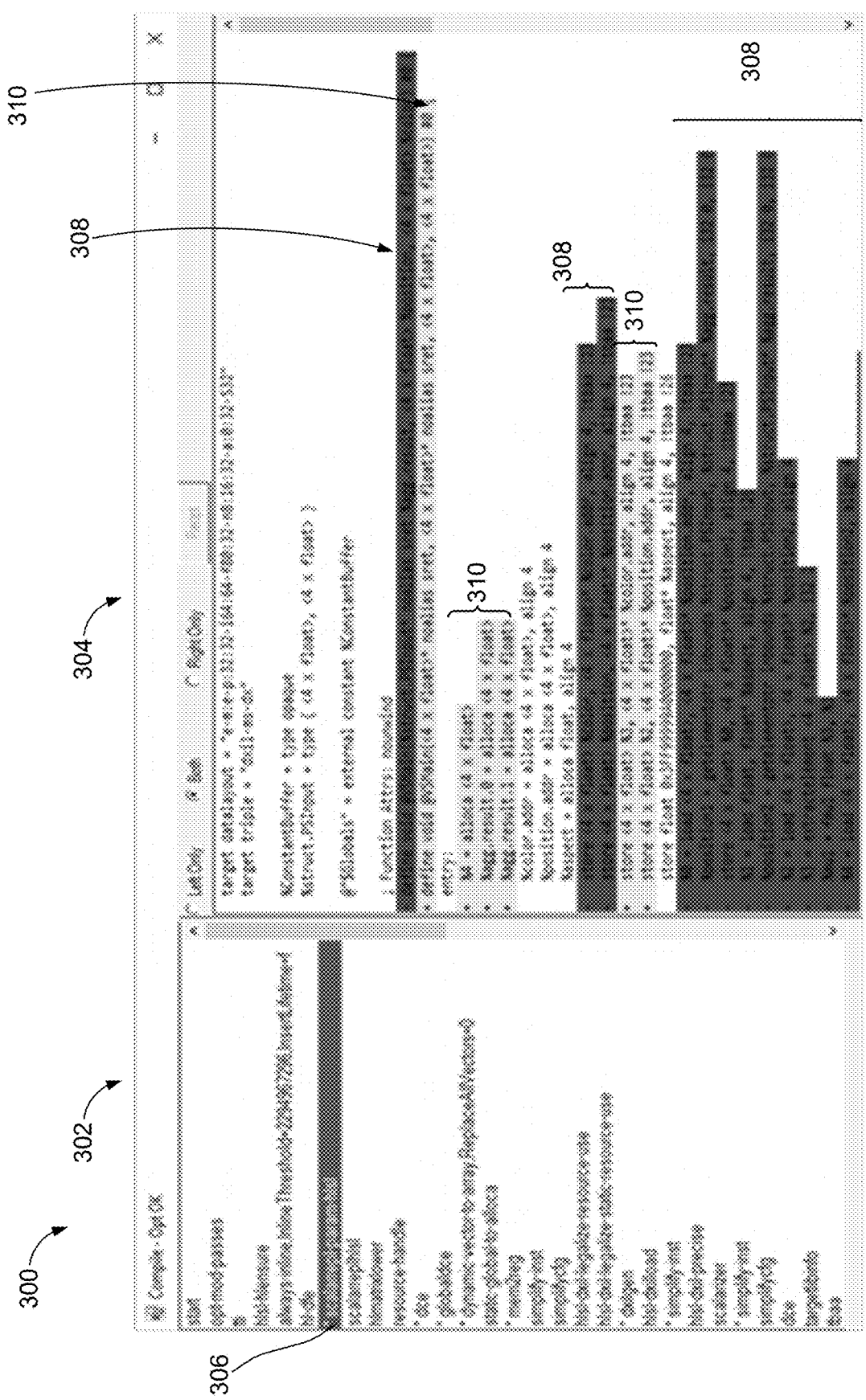
FIG. 3 is an example user interface screen that displays optimizer output for a selected pipeline in accordance with an implementation of the present disclosure.

Referring now to FIG. 3, an example user interface screen 300 displays the optimizer output 30 (FIG. 1) upon completion of the executed passes 42 (FIG. 1) of selected pipeline 20 (FIG. 1). A left section 302 of user interface screen 300 may present a list of executed passes 42. A right section 304 of user interface screen 300 may present the corresponding program code representations 43 (FIG. 1) at each point of the executed passes 42 and may help a user perform analysis on the optimizer output. User interface screen 300 may provide a high-level program representation of the optimizer output 30 along with the optimization pipeline configuration. A user may select a pass 306 from the list of executed passes 42 and the corresponding program code representations 43 for the selected pass 306, may be presented on in right section 304. Program code representation 43 may include highlighting 308 and 310 that may illustrate differences between program code representation 43 before and after the selected pass 306. For example, a red highlighting 308 may indicate code that existed prior to the selected pass 306 and may no longer exist in the program code representation 43. In addition, a yellow highlighting 310 may illustrate newly introduced code in the program code representation 43. As such, a user may be provide with additional visual information so that a user may easily identify changes made to the program code representations 43 after the executed passes 42. A user may select the output at any point in the pipeline 20 to modify the associated program code 12.

Referring back to FIG. 1, user interface component 32 may also include a text editor 34 that a user may use to edit the program code representations 43 of the optimizer output 30 and generate edited code 36. For example, a user may select the optimizer output 30 at any point in the pipeline 20, and may modify the program code representations 43. A user may use a restart component 37 to run optimizer 16 on the edited code 36 in order to test the edited code 36 and determine if the desired results are achieved.

Figure 4:
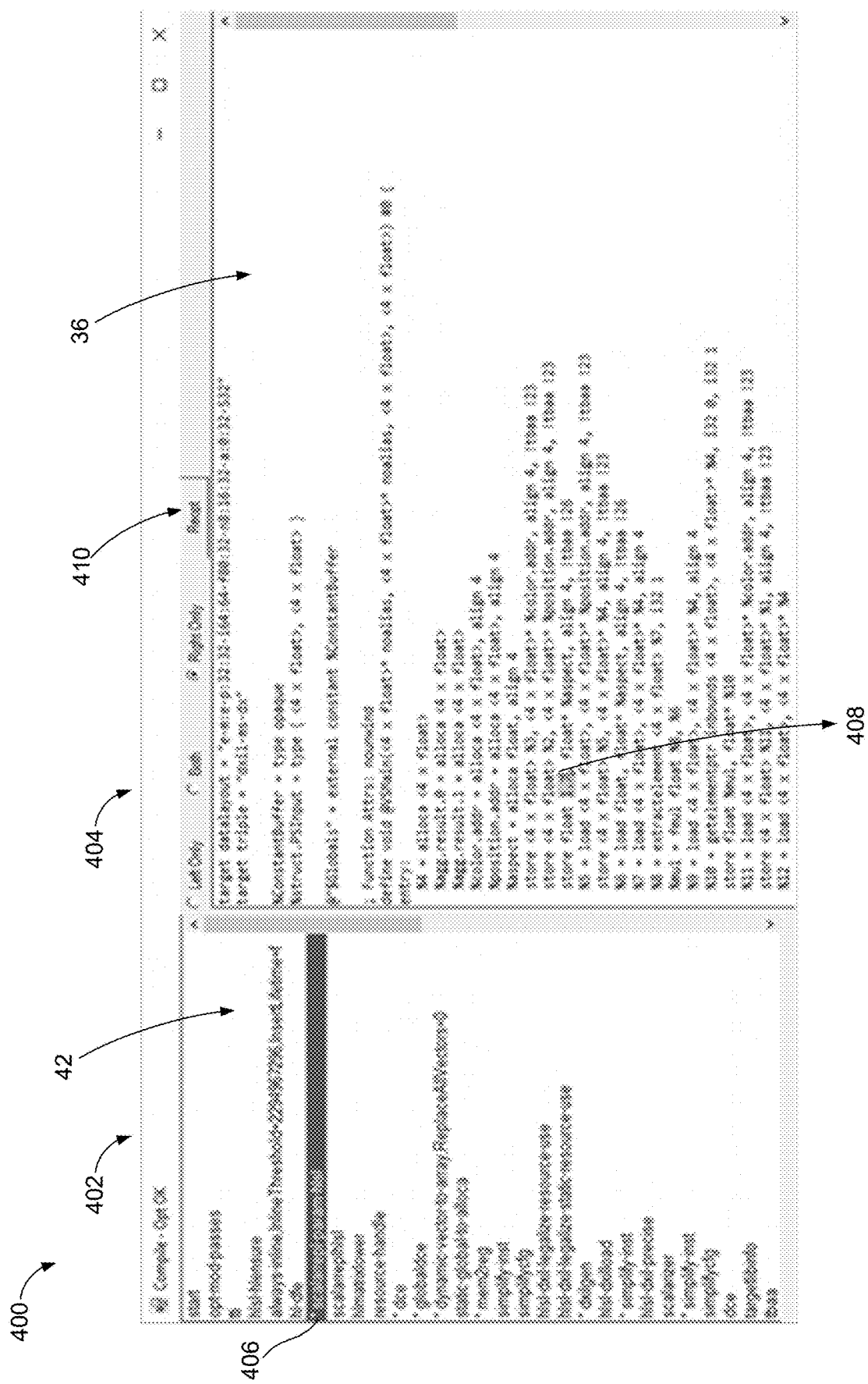
FIG. 4 is an example user interface screen that displays edited code in accordance with an implementation of the present disclosure.

Referring to FIG. 4, an example user interface screen 400 displays edited code 36 (FIG. 1) of the program code representations 43 (FIG. 1) for an executed pass 42 (FIG. 1) performed by optimizer 16 (FIG. 1). A left section 402 of user interface screen 400 may present a list of executed passes 42 performed by optimizer 16. A right section 404 of user interface screen 300 may present edited code 36 for the corresponding program code representations 43 at each point of the executed passes 42. A user may select a pass 406 from the list of executed passes 42 and edit the corresponding program code representations 43 for the selected pass 406. For example, a user may change the value of character 408 to 1.7. As such, edited code 36 may now include the new value for character 408. A user may select a "Reoptimize" button 410 to direct optimizer 16 to run starting from the changes with the remainder of the pipeline. The user may make further modifications to the program code representations 43 based on the additional optimization performed by optimizer 16.

Referring back to FIG. 1, optimizer 16 may receive edited code 36 and may run the selected pipeline 20 and passes 22 starting from where the modifications occurred in the edited code 36. For example, pass execution coordinator 24 may initialize, configure, and/or run each pass 22 as described in the selected pipeline 20 starting where the modifications occurred in the edited code 36. Pass execution coordinator 24 may also generate and/or collect revised program code representations 43 of the executed passes 42. Optimizer 16 may generate revised program code representations 43 of the executed passes 42 and may transmit the revised optimizer output 30 to user interface component 32. A user may use user interface component 32 to make further modifications and/or changes to the program code representations 43 and request optimizer 16 to run further passes 22 on the edited code 36. Moreover, a user may use user interface component 32 to further modify and/or change the selected pipeline 20 and/or the passes 22 of the selected pipeline 20 before optimizer 16 executes the selected pipeline 20 on the edited code 36.

As such, the user may perform changes to the optimizer output 30, while continuing to leverage all the other passes 22 that follow. While existing assemblers/disassemblers allow a user to work on the final form of the program code 12, by enabling working at any intermediate point, optimizer 16 allows the user to take advantage of the available passes 38 that are cumbersome to handle by hand, such as, but not limited to, register allocation, instruction selection, and constant propagation.

In an implementation, optimizer 16 may be able to round-trip all of its state at any point between passes or phases. For example, optimizer 16 may provide a text representation for all of the states of optimizer 16 at any point between passes, as well as, read the text representation back to restore an original state of optimizer 16. As such, optimizer 16 may write out the state information in text form, a user may modify and/or change the state information, and a user may feed the state information back to optimizer 16 so that optimizer 16 may keep working on the modified state information. In addition, the optimizer may provide a machine-readable description of its optimization pipeline and support the configuration of its optimizer pipeline, including adding, removing and reordering passes, as well as specifying the input from an externally-produced representation.

In addition, optimizer 16 may be configured to not perform a full dump of the program code representations 43 at each point (e.g., each executed pass 42) so that optimizer 16 may be more efficient. Optimizer 16 may provide in the program code representation 43 information on how to re-execute and/or extract the full representation. For example, the program code representation 43 may include a list of passes to obtain a full program code representation 43 after each point.

If optimizer 16 has any dependency between executed passes 42, optimizer 16 may also provide the dependency information in the program code representation 43 to describe how to configure an optimization pipeline to resume at each point in the pipeline. For example, the program code representation 43 may include the list of passes to be prepended at each pass to load, validation, and/or process any additional information that may be required by that pass. In addition, optimizer 16 may have the ability to specify that an executed pass 42 has not changed from the prior representation, producing a more compact output.

As such, user interface component 32 may allow program and compiler developers the flexibility to experiment with program code 12 at multiple points during the optimization process by interactively editing program code 12 at any point between the passes executed by the optimizer and resume optimization of program code 12.

One example use case may include a game developer using optimizer 16 to speed up the compile time of program code 12 for the game. In addition, the game developer may use optimizer 16 to verity that program code 12 is correct and/or to debug program code 12.

Another use case may include developers building different compilers, such as, but not limited to, compilers for graphics cards. Compiler developers may use optimizer 16 during the development of the compilers to identify low level performance issues of the program code 12 and/or determine whether changes to the program code 12 may improve the performance of the compilers. For example, compiler developers may use optimizer 16 to interactively edit the program code representations 43 of the program code 12 to determine whether a change may improve the performance of the compilers (e.g., run faster) and/or fix an identified problem in the program code 12.

Figure 5:
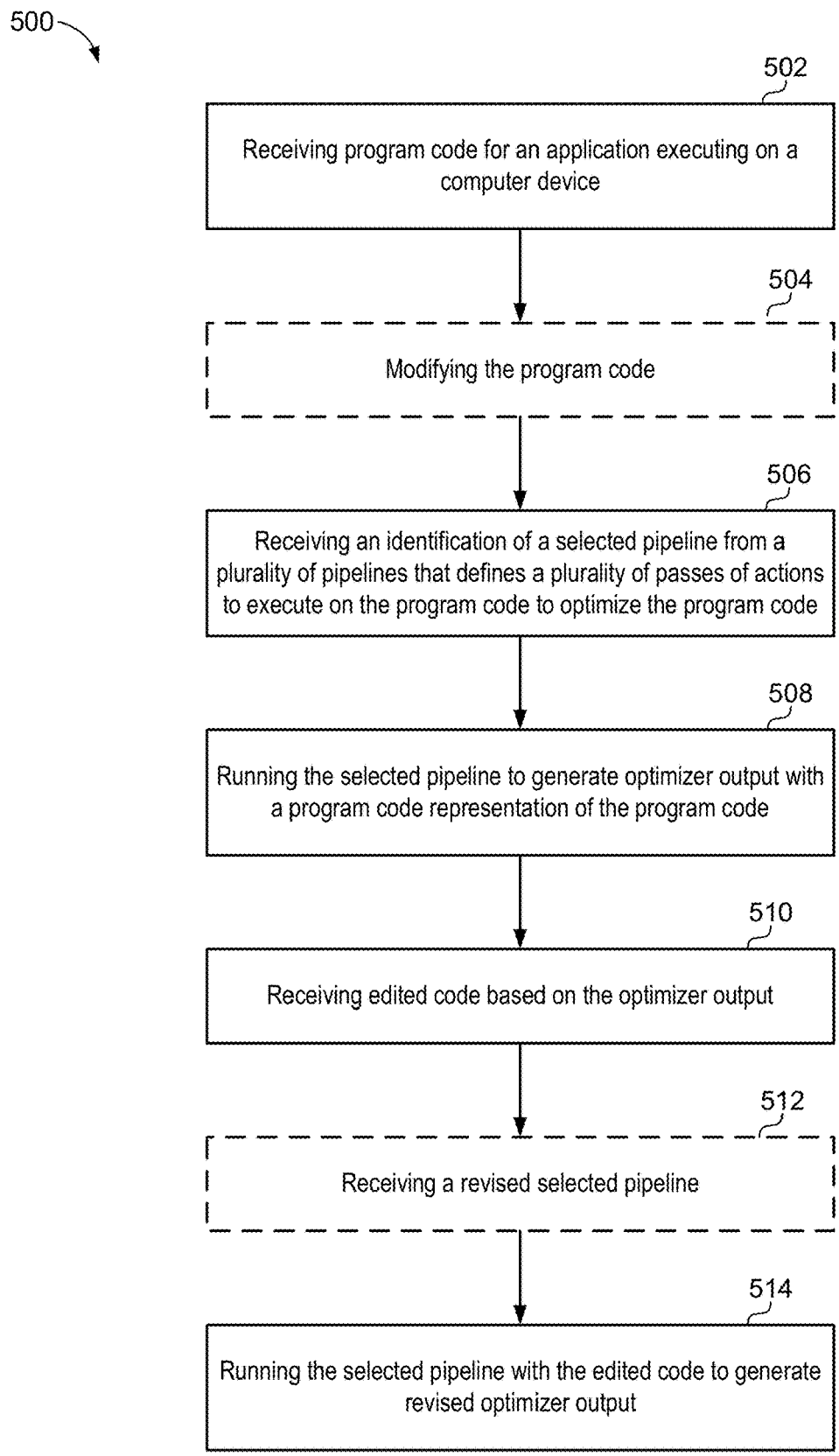
FIG. 5 is a flow diagram of an example of a method of generating program code representations of program code in accordance with an implementation.

Referring now to FIG. 5, an example method 500 may be used by compiler 14 (FIG. 1) and/or optimizer 16 (FIG. 1) to generate program code representations 43 (FIG. 1) of program code 12 (FIG. 1).

At 502, method 500 may include receiving program code for an application executing on a computer device. A user of computer device 102 may use user interface component 32 to upload the program code 12 to compiler 14. In another implementation, application 10 may automatically transmit program code 12 to compiler 14.

At 504, method 500 may optionally include modifying the program code. Optimizer 16 may optionally include a language compiler 26 operable to transform program code 12 into a modified code 28 form suitable for the optimizer 16.

For example, if the program code 12 is in a format not recognizable by the optimizer 16, language compiler 26 may transform the original program code 12 into modified code 28 recognized by the compiler 14. Language compiler 26 may also provide an optimization pipeline that provides a user an understanding of compiler options (e.g., flags to control precision, level of optimization, whether debug information is to be preserved, etc.).

At 506, method 500 may include receiving an identification of a selected pipeline that defines a plurality of passes of actions to execute on the program code to optimize the program code. In an implementation, user interface component 32 may present one or more available pipelines 48 for optimizer 16 that describe various operations that optimizer 16 may perform on program code 12 in the form of transformation and/or optimization passes 22. Example pipelines 48 may include, but are not limited to, pipelines to optimize program code for speed, pipelines to optimize program code to be smaller, and pipelines to make the program code easier to debug. For each available pipelines 48, user interface component 32 may also present one or more available passes 38 and the corresponding pass properties 40. The one or more available passes 38 may include a list of actions optimizer 16 may perform to achieve the desired outcomes of pipelines 48. Pass properties 40 may describe the actions optimizer 16 may perform when executing the one or more available passes 38. For example, pass properties 40 may include, but are not limited to, a verify action that verifies the program code, and a dead code action that removes code that may not be accessed.

A user may select a pipeline 20 for optimizer 16 to perform. In addition, a user may edit and/or revise the passes 22 associated with the selected pipeline 20. For example, a user may remove one or more passes 22 for the selected pipeline 20. In addition, a user may rearrange one or more passes 22 to modify an order in which the selected pipeline 20 executes the one or more passes 22. For example, a user may remove one or more passes 22 to speed up optimizer 16. A user may also rearrange an order in which the one or more passes 22 are executed in the selected pipeline 20. For example, a user may want to run a pass 22 to remove dead code from the program code 12 early in the selected pipeline 20 to clean up the program code 12 before additional passes 22 are executed on the program code 12.

In another implementation, optimizer 16 may automatically select a pipeline 20 from the one or more available pipelines 48 to run on program code 12. A user may select an optimization outcome 21 and based on the selected optimization outcome 21, optimizer 16 may automatically select a pipeline 20 and a list of passes 22 to achieve the selected optimization outcome 21. For example, a user may select an optimization outcome 21 for smaller code. Optimizer 16 may automatically select a pipeline 20 and a list of passes 22 to reduce the program code 12 for smaller code. If a user selects an optimization outcome 21 for faster code, optimizer 16 may automatically select a different pipeline 20 and a list of passes 22 to make the program code 12 faster. As such, different optimization outcomes 21 may have the same and/or different selected pipelines 20 to achieve the desired changes to the program code.

At 508, method 500 may include running the selected pipeline to generate optimizer output with a program code representation of the program code. Optimizer 16 may execute the passes 22 for the selected pipeline 20 on the received program code 12. Optimizer 16 may include a pass execution coordinator 24 that initializes, configures, and/or runs each pass 22 as described in the selected pipeline 20. Pass execution coordinator 24 may also coordinate the inputs and outputs of each pass 22, as well as any shared state. In addition, pass execution coordinator 24 may generate and/or collect program code representations 43 of the program code 12 after each executed pass 42.

Optimizer 16 may generate optimizer output 30 once the passes 22 for the selected pipeline 20 are completed. The optimizer output 30 may include, for example, a list of executed passes 42 on the program code 12 and the program code representations 43 of the program code 12 at each executed pass 42. The program code representations 43 may be an assembly listing in text form or a binary encoding of assembly. In both cases, some amount of metadata is provided in addition to the program instructions. The optimizer output 30 may also include a final program in binary form upon completion of the executed passes 42. In an implementation, the optimizer output 30 may be provided after each of the executed passes 42 for the selected pipeline 20. For example, the list of executed passes 42 and/or the program code representations 43 may be provided as it exists after each of the executed passes 42. In addition, the program code representations 43 may be used to verify the program code at any point between the executed passes 42 for the selected pipeline 20.

At 510, method 500 may include receiving edited code based on the optimizer output. User interface component 32 may present the optimizer output 30 to a user. For example, the user interface component 32 may present the program code representations 43 and executed passes 42 in a text-based format with one line per pass and configuration options following each pass name on that line so that a user may use a text editor 34 to copy and paste the configuration between programs, edit the program code representations 43, and/or save the program code representations 43 along with sources. User interface component 32 may also include a text editor 34 that a user may use to edit the program code representations 43 of the optimizer output 30 and generate edited code 36. For example, a user may select the optimizer output 30 at any point in the pipeline 20, and may modify the program code representations 43. A user may use a restart component 37 to run optimizer 16 on the edited code 36 in order to test the edited code 36 and determine if the desired results are achieved. Optimizer 16 may receive edited code 36.

At 512, method 500 may optionally include receiving a revised selected pipeline. For example, a user choose one of the available pipelines 48, e.g., selected pipeline 20, for optimizer 16 to perform. In addition, a user may edit and/or revise the passes 22 associated with the selected pipeline 20. For example, a user may remove one or more passes 22 for the selected pipeline 20. In addition, a user may rearrange one or more passes 22 to modify an order in which the selected pipeline 20 executes the one or more passes 22. For example, a user may remove one or more passes 22 to speed up optimizer 16. A user may also rearrange an order in which the one or more passes 22 are executed in the selected pipeline 20. For example, a user may want to run a pass 22 to remove dead code from the program code 12 early in the selected pipeline 20 to clean up the program code 12 before additional passes 22 are executed on the program code 12.

At 514, method 500 may include running the selected pipeline with the edited code to generate revised optimizer output. Optimizer 16 may run the selected pipeline 20 and passes 22 starting from where the modifications occurred in the edited code 36. Pass execution coordinator 24 may initialize, configure, and/or run each pass 22 as described in the selected pipeline 20 starting where the modifications occurred in the edited code 36 and generate and/or collect revised program code representations 43 of the executed passes 42. Optimizer 16 may transmit the revised optimizer output 30 to user interface component 32. A user may use user interface component 32 to make further modifications and/or changes to the program code representations 43 and request optimizer 16 to run further passes 22 on the edited code 36. Moreover, a user may use user interface component 32 to further modify and/or change the selected pipeline 20 and/or the passes 22 of the selected pipeline 20 before optimizer 16 executes the selected pipeline 20 on the edited code 36.

Figure 6:
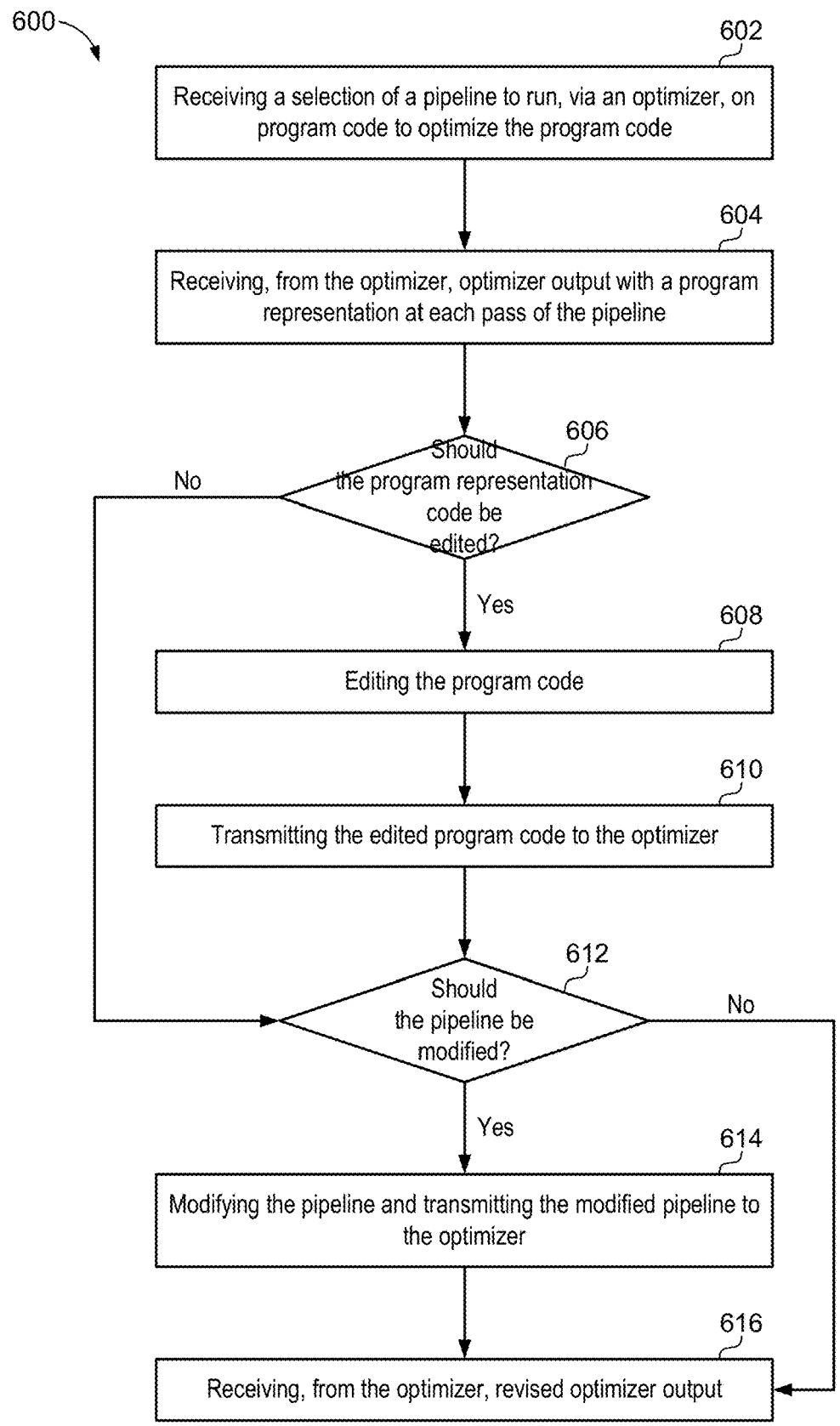
FIG. 6 is a flow diagram of an example of a method of interactive editing of intermediate optimizer representations of program code in accordance with an implementation.

Referring now to FIG. 6, a method 600 for interactive editing of intermediate optimizer representations of program code may be performed by user interface component 32 (FIG. 1).

At 602, method 600 may include receiving a selection of a pipeline to run, via an optimizer, on program code to optimize the program code. For example, user interface component 32 may present one or more available pipelines 48 for optimizer 16 that describe various operations that optimizer 16 may perform on program code 12 in the form of transformation and/or optimization passes 22. Example pipelines 48 may include, but are not limited to, pipelines to optimize program code for speed, pipelines to optimize program code to be smaller, and pipelines to make the program code easier to debug. User interface component 32 may also present one or more available passes 38 and the corresponding pass properties 40. The one or more available passes 38 may include a list of actions optimizer 16 may perform to achieve the desired outcomes of pipelines 48. For example, the available passes 38 may be cumbersome to handle by hand, such as, but not limited to, register allocation, instruction selection, constant propagation, verification, and dead code elimination. Pass properties 40 may describe the actions optimizer 16 may perform when executing the one or more available passes 38. For example, pass properties 40 may include, but are not limited to, a limit to a number of iterations to perform when removing dead code, and an estimate for memory latency on the target computer.

A user may select a pipeline 20 for optimizer 16 to perform. In addition, a user may edit and/or revise the passes 22 associated with the selected pipeline 20. For example, a user may remove one or more passes 22 for the selected pipeline 20. In addition, a user may rearrange one or more passes 22 to modify an order in which the selected pipeline 20 executes the one or more passes 22. For example, a user may remove one or more passes 22 to speed up optimizer 16. A user may also rearrange an order in which the one or more passes 22 are executed in the selected pipeline 20. For example, a user may want to run a pass 22 to remove dead code from the program code 12 early in the selected pipeline 20 to clean up the program code 12 before additional passes 22 are executed on the program code 12.

At 604, method 600 may include receiving, from the optimizer, optimizer output with a program representation at each pass of the pipeline. Optimizer 16 may generate optimizer output 30 once the passes 22 for the selected pipeline 20 are completed. The optimizer output 30 may include, for example, a list of executed passes 42 on the program code 12 and the program code representations 43 of the edited program code at each executed pass 42. The program code representations 43 may be an assembly listing in text form or a binary encoding of assembly. In both cases, some amount of metadata is provided in addition to the program instructions. The optimizer output 30 may also include a final program in binary form upon completion of the executed passes 42.

At 606, method 600 may include determining whether the program representation code should be edited. For example, a user may use user interface component 32 to make further modifications and/or changes to the program code representations 43 and request optimizer 16 to run further passes 22 on the edited code 36. Moreover, a user may use user interface component 32 to further modify and/or change the selected pipeline 20 and/or the passes 22 of the selected pipeline 20 before optimizer 16 executes the selected pipeline 20 on the edited code 36.

At 608, method 600 may include editing the program representation code. For example, user interface component 32 may also include a text editor 34 that a user may use to edit the program code representations 43 of the optimizer output 30 and generate edited code 36. A user may select the optimizer output 30 at any point in the pipeline 20, and may modify the program code representations 43. A user may use a restart component 37 to run optimizer 16 on the edited code 36.

At 610, method 600 may include transmitting the edited program code to the optimizer. User interface component 32 may transmit the edited program code 36 to optimizer 16.

At 612, method 600 may include determining whether the pipeline should be modified. For example, a user may select a different pipeline 20 for optimizer 16 to perform. In addition, a user may edit and/or revise the passes 22 associated with the selected pipeline 20. For example, a user may remove one or more passes 22 for the selected pipeline 20. In addition, a user may rearrange one or more passes 22 to modify an order in which the selected pipeline 20 executes the one or more passes 22. For example, a user may remove one or more passes 22 to speed up optimizer 16. A user may also rearrange an order in which the one or more passes 22 are executed in the selected pipeline 20. For example, a user may want to run a pass 22 to remove dead code from the program code 12 early in the selected pipeline 20 to clean up the program code 12 before additional passes 22 are executed on the program code 12.

At 614, method 600 may include modifying the pipeline and transmitting the modified pipeline to the optimizer. A user may use selection component 44 to select a different pipeline 20 and/or modify one or more passes 22 of the existing pipeline 20. User interface component 32 may transmit the different pipeline 20 and/or revised pipeline 20 to optimizer 16.

At 616, method 600 may include receiving, from the optimizer, revised optimizer output. Optimizer 16 may run the selected pipeline 20 and passes 22 starting from where the modifications occurred in the edited code 36. Pass execution coordinator 24 may initialize, configure, and/or run each pass 22 as described in the selected pipeline 20 starting where the modifications occurred in the edited code 36. Pass execution coordinator 24 may also generate and/or collect revised program code representations 43 of the executed passes 42. Optimizer 16 may transmit the revised optimizer output 30 to user interface component 32. A user may use user interface component 32 to make further modifications and/or changes to the program code representations 43 and request optimizer 16 to run further passes 22 on the edited code 36. Moreover, a user may use user interface component 32 to further modify and/or change the selected pipeline 20 and/or the passes 22 of the selected pipeline 20 before optimizer 16 executes the selected pipeline 20 on the edited code 36.

As such, the user may perform changes to the optimizer output 30, while continuing to leverage all the other passes 22 that follow. While existing assemblers/disassemblers allow a user to work on the final form of the program, working at any intermediate point, optimizer 16 allows the user to take advantage of the available passes 38 that are cumbersome to handle by hand, such as, but not limited to, register allocation, instruction selection, and constant propagation.

Figure 7:
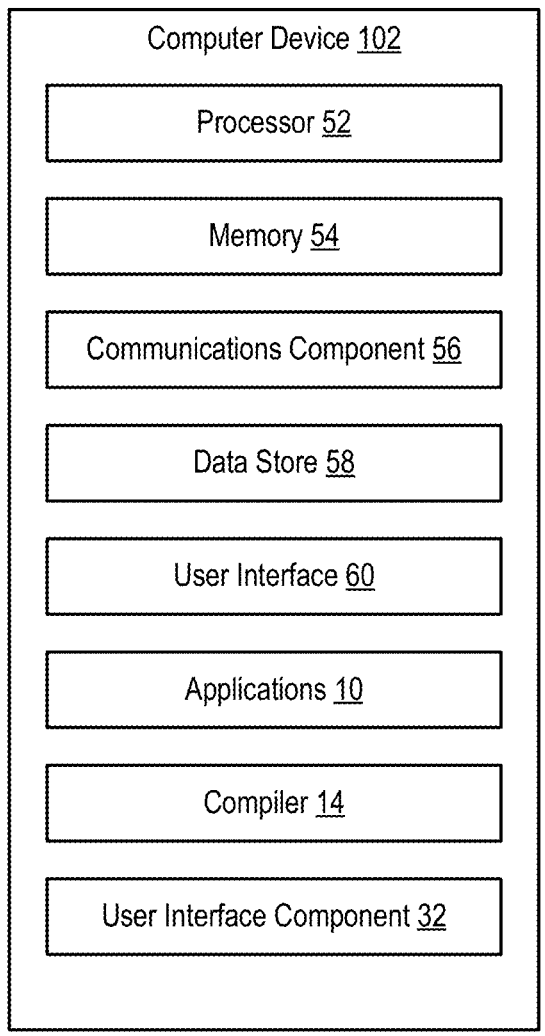
FIG. 7 is a schematic block diagram of an example device in accordance with an implementation of the present disclosure.

Referring now to FIG. 7, illustrated is an example computer device 102 in accordance with an implementation, including additional component details as compared to FIG. 1. In one example, computer device 102 may include processor 52 for carrying out processing functions associated with one or more of components and functions described herein. Processor 52 can include a single or multiple set of processors or multi-core processors. Moreover, processor 52 can be implemented as an integrated processing system and/or a distributed processing system.

Computer device 102 may further include system memory 54, such as for storing local versions of applications being executed by processor 52. System memory 54 can include a type of memory usable by a computer, such as random access memory (RAM), read only memory (ROM), tapes, magnetic discs, optical discs, volatile memory, non-volatile memory, and any combination thereof. Additionally, processor 52 and system memory 54 may include and execute operating system 110 (FIG. 1).

Further, computer device 102 may include a communications component 56 that provides for establishing and maintaining communications with one or more parties utilizing hardware, software, and services as described herein. Communications component 56 may carry communications between components on computer device 102, as well as between computer device 102 and external devices, such as devices located across a communications network and/or devices serially or locally connected to computer device 102. For example, communications component 56 may include one or more buses, and may further include transmit chain components and receive chain components associated with a transmitter and receiver, respectively, operable for interfacing with external devices.

Additionally, computer device 102 may include a data store 58, which can be any suitable combination of hardware and/or software, that provides for mass storage of information, databases, and programs employed in connection with implementations described herein. For example, data store 58 may be a data repository for applications 10 (FIG. 1), program code 12 (FIG. 1), edited code 36 (FIG. 1), program code representations 43 (FIG. 1), available pipelines 48 (FIG. 1), compiler 14 (FIG. 1) and/or user interface component 32 (FIG. 1).

Computer device 102 may also include a user interface component 60 operable to receive inputs from a user of computer device 102 and further operable to generate outputs for presentation to the user. User interface component 60 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 60 may include one or more output devices, including but not limited to a display, a speaker, a haptic feedback mechanism, a printer, any other mechanism capable of presenting an output to a user, or any combination thereof.

In an implementation, user interface component 60 may transmit and/or receive messages corresponding to the operation of applications 10, compiler 14, and/or user interface component 32. In addition, processor 52 executes applications 10, compiler 14, and/or user interface component 32 and system memory 54 or data store 58 may store them.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features may have been presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a user terminal. In the alternative, the processor and the storage medium may reside as discrete components in a user terminal. Additionally, in some implementations, the steps and/or actions of a method or algorithm may reside as one or any combination or set of codes and/or instructions on a machine readable medium and/or computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with examples disclosed herein.

What is claimed is:

1. A computer device, comprising: a memory to store data and instructions; at least one processor in communication with the memory; at least one compiler in communication with the memory and the at least one processor, wherein the compiler is operable to: receive a selection of a pipeline from a plurality of available pipelines that define a plurality of passes of work the compiler executes on program code for an application; run each pass of the plurality of passes for the pipeline and coordinate state information between each pass of the plurality of passes; generate a list of state information and executed passes from the plurality of passes on the program code; interactively edit the program code between at least one pass of the executed passes; and generate program code representations of the edited program code in response to the executed passes.

2. The computer device of claim 1, wherein the state information is provided between each pass of the plurality of passes.

3. The computer device of claim 1, wherein the compiler is further operable to:
receive modified state information; and
continue to run each pass of the plurality of passes using the modified state information.

4. The computer device of claim 1, wherein the compiler is operable to:
coordinate shared states between each pass by calculating data for future passes of the plurality of passes to use.

5. The computer device of claim 4, wherein the data is an interference graph that provides descriptions of program values in use at different points in the program code at a same time.

6. The computer device of claim 1, wherein the compiler is further operable to:
receive modifications to the pipeline and generate a modified pipeline in response to the modifications; and
run the modified pipeline and generate revised program code representations of the edited program code.

7. The computer device of claim 6, wherein the modifications include a selection of a different pipeline.

8. The computer device of claim 6, wherein the modifications include one or more of adding a pass to the pipeline, removing a pass from the pipeline, or rearranging the plurality of passes.

9. The computer device of claim 6, wherein the modifications include editing the plurality of passes.

10. The computer device of claim 6, wherein the compiler is further operable to run the modified pipeline from where modifications occurred in the edited program code.

11. A method for editing program code using a compiler on a computer device, the method comprising: receiving a selection of a pipeline from a plurality of available pipelines that define a plurality of passes of work the compiler executes on program code for an application; running each pass of the plurality of passes for the pipeline and coordinating state information between each pass of the plurality of passes; generating a list of state information and executed passes from the plurality of passes on the program code; interactively editing the program code between at least one pass of the executed passes; and generating program code representations of the edited program code in response to the executed passes.

12. The method of claim 11, wherein the state information is provided between each pass of the plurality of passes.

13. The method of claim 11, further comprising:
receiving modified state information; and
continuing running each pass of the plurality of passes using the modified state information.

14. The method of claim 11, wherein coordinating the state information further includes coordinating shared states between each pass by calculating data for future passes of the plurality of passes to use.

15. The method of claim 14, wherein the data is an interference graph that provides descriptions of program values in use at different points in the program code at a same time.

16. The method of claim 11, wherein the method further comprises:
receiving modifications to the pipeline and generate a modified pipeline in response to the modifications; and running the modified pipeline and generate revised program code representations of the edited program code.

17. The method of claim 16, wherein the modifications include a selection of a different pipeline.

18. The method of claim 16, wherein the modifications include one or more of adding a pass to the pipeline, removing a pass from the pipeline, rearranging the plurality of passes, or editing the plurality of passes.

19. The method of claim 16, further comprising running the modified pipeline from where modifications occurred in the edited program code.

20. A non-transitory computer-readable medium storing instructions executable by a computer device, comprising: at least one instruction for causing the computer device to receive a selection of a pipeline from a plurality of available pipelines that define a plurality of passes of work a compiler executes on program code for an application; at least one instruction for causing the computer device to run each pass of the plurality of passes for the pipeline and coordinate state information between each pass of the plurality of passes; at least one instruction for causing the computer device to generate a list of state information and executed passes from the plurality of passes on the program code; at least one instruction for causing the computer device to interactively edit the program code between at least one pass of the executed passes; and at least one instruction for causing the computer device to generate program code representations of the edited program code in response to the executed passes.

* * * * *